(12) United States Patent  
Ferragut et al.

(10) Patent No.: US 7,441,732 B2
(45) Date of Patent: Oct. 28, 2008

(54) SUPPORTING COLLAR

(75) Inventors: Eric Ferragut, D'Huison-Longueville (FR); Christian Mazelle, Saclay (FR); Pascal Pelisson, Le Chatelet en Brie (FR)

(73) Assignee: Hispano-Suiza, Colombes (FR)

( * ) Notice: Subject to any disclaimer, the term of this patent is extended or adjusted under 35 U.S.C. 154(b) by 160 days.

(21) Appl. No.: 11/376,346

(22) Filed: Mar. 16, 2006

(65) Prior Publication Data

US 2006/0237598 A1    Oct. 26, 2006

(30) Foreign Application Priority Data

Mar. 18, 2005    (FR)    .................... 05 02695

(51) Int. Cl.
*F16L 3/08*    (2006.01)
(52) U.S. Cl. .................. 248/74.1; 248/606; 267/140.13
(58) Field of Classification Search .............. 248/58, 248/60, 62, 74.1, 560, 606; 418/45, 153, 418/154; 267/140.13, 292, 219
See application file for complete search history.

(56) References Cited

U.S. PATENT DOCUMENTS 2,998,217 A    8/1961  Englis et al.
3,323,763 A *  6/1967  Butts .......................... 248/606
3,561,078 A    2/1971  Care
4,458,888 A *  7/1984  Wolf et al. ............. 267/140.12
4,881,426 A * 11/1989  Serizawa et al. ............ 474/166
6,386,065 B1 * 5/2002  Hodjat ....................... 74/574.4

FOREIGN PATENT DOCUMENTS

DE    23 53 619 A1    5/1975
DE    79 32 188 U1    4/1980

OTHER PUBLICATIONS

Patent Abstracts of Japan, JP 11-013942, Jan. 22, 1999.

* cited by examiner

*Primary Examiner*—Korie H. Chan
(74) *Attorney, Agent, or Firm*—Oblon, Spivak, McClelland, Maier & Neustadt, P.C.

(57) ABSTRACT

Supporting collar (10) for an element (8) such as a cable or a pipe, comprising a strap (18) capable of being fixed to a support (12), an outer sleeve (16) encircled by this strap (18), an inner sleeve (14) through which said element (8) can pass, and a deformable web (15) connecting said sleeves (14, 16) and allowing the inner sleeve (14) to move relative to the outer sleeve (16). The outer sleeve (16), the web (15) and the inner sleeve (14) are formed as a single central part made of an elastomeric material, e.g. fluorosilicone. The element (8) is secured to the inner sleeve (14) with the aid of a fastening collar (20) that is fastened around the inner sleeve (14).

17 Claims, 3 Drawing Sheets

SUPPORTING COLLAR

BACKGROUND OF THE INVENTION

1. Field of the invention

The invention relates to a collar for supporting an element, such as a cable or a pipe, on a support. Such a collar can be used, for example, for supporting one or more electric cables, or a pipe carrying a fluid.

2. Discussion of the background

More specifically, as illustrated in FIG. 1, such a collar can be used in an aeroplane engine for fixing to the inside of the nacelle casing the electric cables connecting the power module to the computing module of the thrust reversers, which are used to brake the aeroplane during the landing operation.

In practice, these modules are two very heavy boxes 4 (generally weighing more than 14 kg each) separated by a distance of a few tens of centimetres and mounted on dampers 6 to the inside of the nacelle casing 2. The dampers 6 allow movement of the boxes 4 relative to the casing 2 with an amplitude of a few millimetres (between 5 and 10 mm) in all directions.

The electric cables connecting these boxes 4 are held together inside a harness 8 which has a diameter of a few tens of millimetres, and generally passes around elements of the thrust reverser (an actuator 9 in the example illustrated). As the harness 8 cannot be left free to move inside the casing 2 (because of the risk of damage to it or to parts in the vicinity, or the risk of disconnection, etc.), a supporting collar is used.

As they move about independently of each other, the boxes 4 exert forces on the harness that can be directed in any direction of space X, Y and Z, that is to say axially in direction X as well as radially in directions Y and Z.

The supporting collars used hitherto take the form of a fastening strap passed around the harness and fixed to the casing. These collars have been found to be unsuitable because they prevent all movement of the harness, which not only hampers the freedom of movement of the boxes but is also the cause of significant stresses in the fastening strap which can damage the harness.

SUMMARY OF THE INVENTION

It is an object of the invention to provide a supporting collar that will support the harness while allowing it to make small movements in all directions in space.

To achieve this object, the subject of the invention is a supporting collar for an element such as a cable or a pipe, comprising a strap capable of being fixed to a support, an outer sleeve encircled by this strap, an inner sleeve through which said element can pass, and a deformable web connecting the inner and outer sleeves and allowing the inner sleeve to move relative to the outer sleeve, this web being formed by two annular membranes that come together at the outer sleeve and diverge with distance from the latter.

A supporting collar of this kind can be used to fix an element such as the harness described earlier or be used for other purposes.

Because of the deformability of the web, the inner sleeve and the element (cable or pipe) passing through it are free to make limited movements (limited in terms of amplitude) in any direction. The inner sleeve therefore performs a function of multidirectional guidance for said element.

Said element is preferably attached to the inner sleeve by any appropriate fixing means, such as adhesive bonding or, in one particular embodiment, with the aid of at least one fastening collar which is fastened around the inner sleeve and around said element.

Advantageously, the web is relaxed so as to be slightly loose when the supporting collar is at rest, that is when the supported element stays in its initial position. In other words, the web is designed to have deformations (curve(s) or fold(s)) giving it an elasticity of shape. In this way the web can deform by stretching when the inner sleeve moves. In an illustrative embodiment, the membranes forming the web are curved and, when the inner sleeve moves, one membrane stretches (i.e. its radius of curvature increases) while the other membrane bends (i.e. its radius of curvature decreases).

Advantageously also, the web is made of an elastic material. The web thus has a so-called intrinsic elasticity, in opposition to the elasticity of shape referred to above.

If the web has these two types of elasticity, then when the inner sleeve moves a small amount, its deformation stresses only its elasticity of shape; that is, it experiences almost no internal stresses. If the inner sleeve moves a larger amount, the web first extends to the maximum (elasticity of shape), and then stretches elastically so that its intrinsic elasticity is involved.

The intrinsic elasticity of the web is therefore not necessarily stressed, which increases the life of the web and hence that of the supporting collar.

In one embodiment, said annular membranes extend to encircle the inner sleeve.

In another embodiment, said annular membranes extend to form the inner sleeve.

In one particular embodiment, the outer sleeve, the web and the inner sleeve are formed in one part. This part is advantageously made of a material of the elastomer family, for example fluorosilicone, and can be produced by moulding.

The combination of the inner sleeve, the outer sleeve and the web in a single central part avoids the risk of these components coming apart. It also reduces the cost of production of the collar.

BRIEF DESCRIPTION OF THE DRAWINGS

The invention and its advantages will be understood more clearly after reading the following detailed description of an example of an embodiment of the collar of the invention. This description refers to the accompanying figures, in which.

DETAILED DESCRIPTION OF THE PREFERRED EMBODIMENTS

Figure 1:
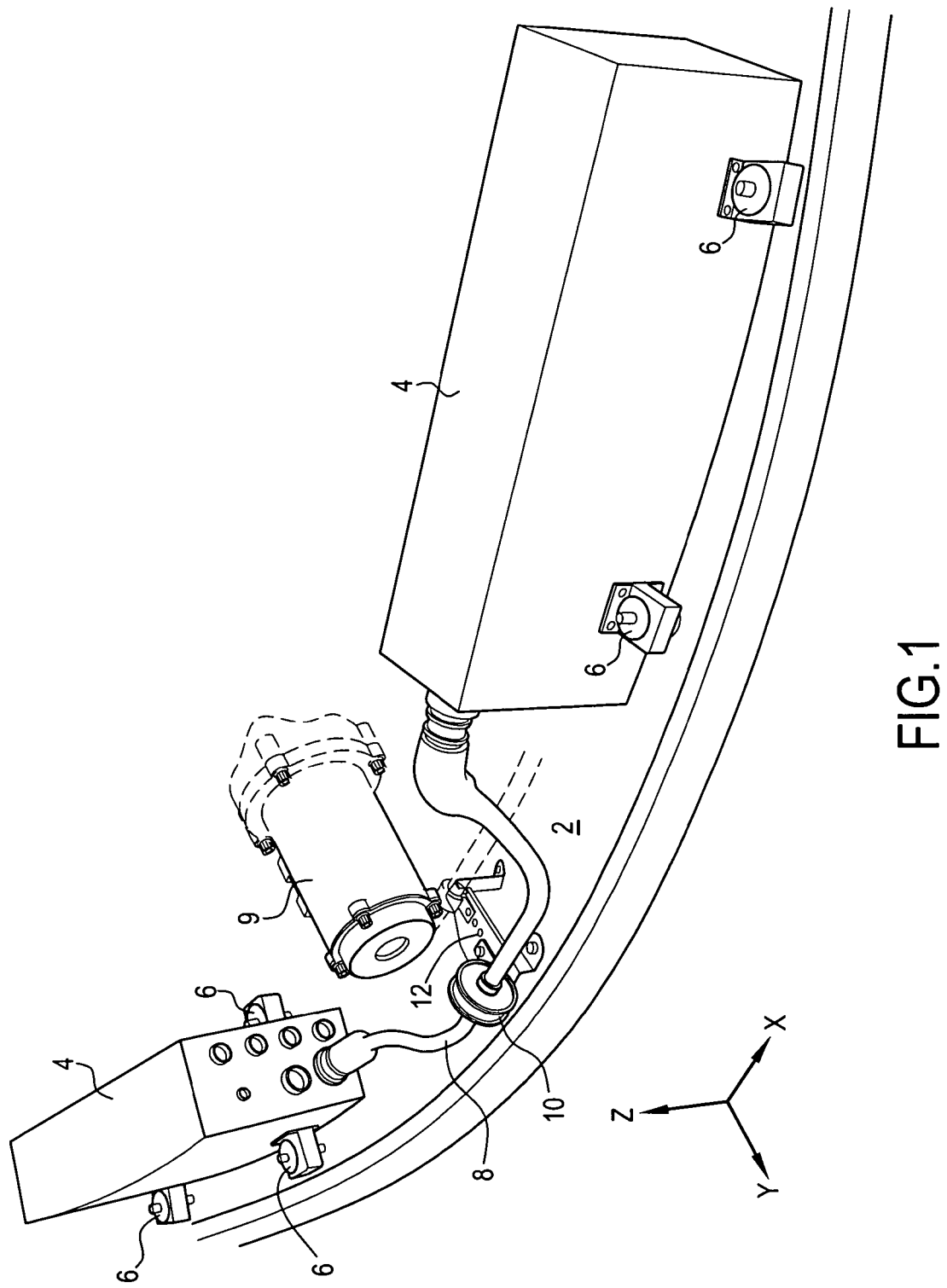
FIG. 1 shows an example of the use of a supporting collar according to the invention.

FIG. 1 shows an installation comprising two boxes 4 connected by a harness 8. This installation is described above. The harness 8 is supported with the help of a supporting collar 10 according to the invention, on a support 12 (connected to the casing 2) to which the collar 10 is fixed. The collar 10 could of course, in another embodiment, be fixed directly to a wall of the casing 2.

Figure 2:
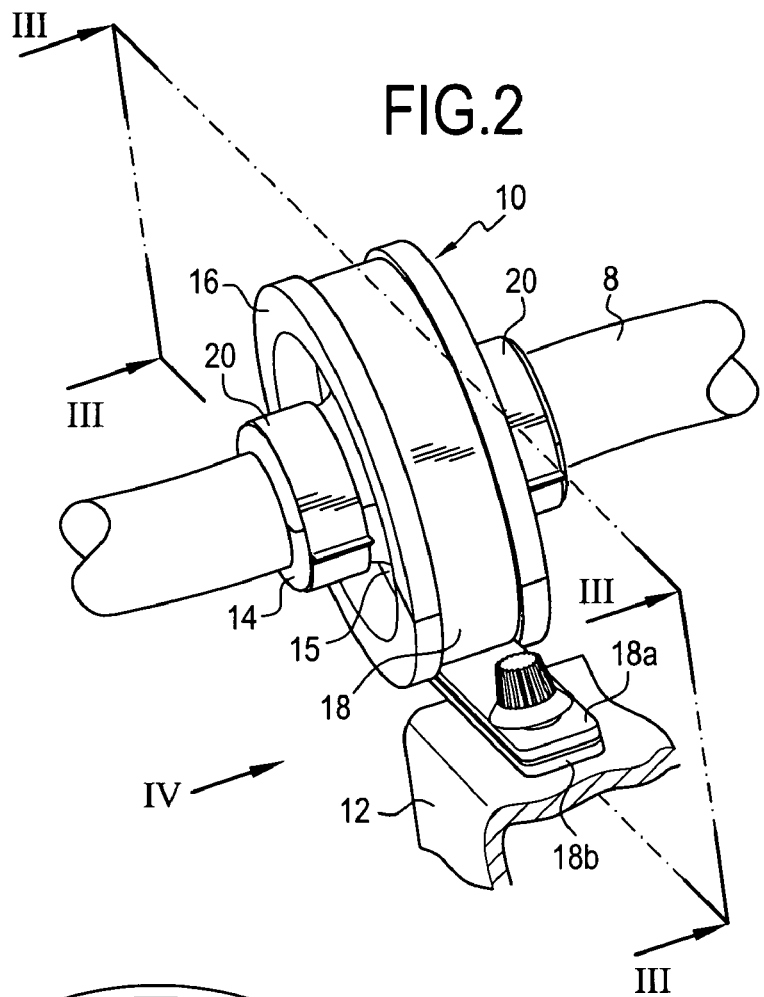
FIG. 2 is a perspective view of an example of a supporting collar according to the invention.
Figure 3:
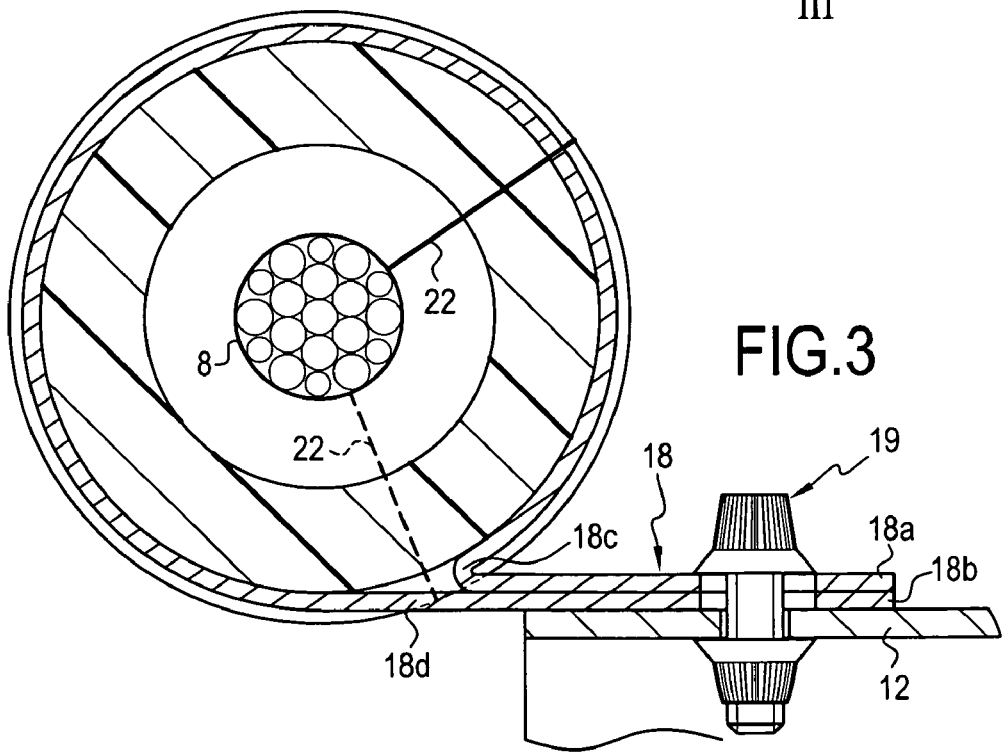
FIG. 3 is a section on the plane III-III through the collar seen in FIG. 2.

Referring to FIGS. 2 and 3, the supporting collar 10 comprises an inner sleeve 14 through which the harness 8 passes, the inside diameter of the sleeve 14 being approximately equal to the outside diameter of the harness 8. An outer sleeve 16 encircles the inner sleeve 14 and a web 15 connects these two sleeves together.

On the outer face of the outer sleeve 16 is a groove 17 (see FIG. 6) to accommodate a fixing strap 18 which encircles the sleeve 16. This strap 18 has two arms 18a, 18b at its ends and these are brought together to close the strap 18.

The strap 18 is preformed for snug contact with practically the entire outer circumference of the outer sleeve, as shown in FIG. 3. In other words, when the strap is closed, the roots of the arms 18a and 18b are brought into virtual contact with each other. The roots of the arms are preferably actually in contact but, in view of the orientation of the arms 18a and 18b and of the shape of their roots, a very small but non-zero gap between them and the circumference of the outer sleeve may remain between the roots of the arms.

In the example of FIG. 3, the root of one of the arms 18a is identified by a bend 18c. This bend 18c is brought virtually into contact with the root 18d of the other arm 18b, which is identified by a discontinuity in the radius of curvature of the strap.

The special shape of the preformed strap 18 allows the latter to be in contact all the way around the outer circumference of the outer sleeve 16, thus ensuring that it does not come off the rim. This is particularly beneficial when the outer sleeve has a radial slit, as will be seen later, which would encourage it to come off the rim.

The strap 18 is fixed to the support 12 through its arms 18a, 18b by a nut/bolt system 19 that passes through openings made in these arms. The system 19 also closes the strap 18.

The harness 8 can be secured to the inner sleeve 14 using any appropriate fixing means. As an example, at least one fastening collar 20 is fastened around the inner sleeve 14 and around the harness 8. The pressure of the collar 20 thus acts on the harness indirectly through the sleeve 14, which advantageously has some elasticity, so that the harness 8 is not damaged.

In the example, two fastening collars 20 are placed at either end of the inner sleeve 14 and are retained by a lip 14a formed at each of these ends. These fastening collars 20 are chosen from the various existing types.

Figure 4:
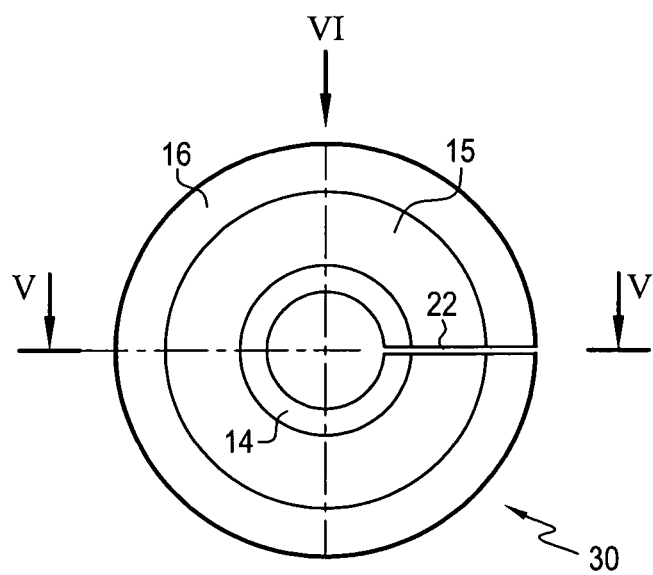
FIG. 4 is an end view in the direction of arrow IV showing the central part of the collar of the invention.

One particular embodiment of the inner sleeve 14, outer sleeve 16 and web 15 will now be described with reference to FIGS. 4 to 6: in this embodiment, these three elements are formed in one part, hereinafter referred to as the central part 30 of the collar.

The central part 30 can be produced easily and cheaply as a moulding and is advantageously made in an elastomeric material such as a fluorosilicone or rubber. In the case of a fluorosilicone, a Shore A hardness of between 40 and 80, and preferably about 60, may be chosen for it. These values are found to be highly suitable for a supporting collar used in an installation such as that shown in FIG. 1.

The central part 30 has symmetry of revolution about the axis A common to the inner 14 and outer 16 cylindrical sleeves. It also has a slit 22 that extends from the inside of the inner sleeve 14 to the outside of the outer sleeve 16. This slit 22 is generally radial (i.e. perpendicular to the axis A).

The slit 22 enables the central part 30 to be opened and placed around the cable or pipe which it is to encircle. This means that it is unnecessary to disconnect the cable or pipe to feed it through the inner sleeve 14 when installing or replacing the collar 10. On the other hand, this slit 22 makes it easier for the central part 30 to become separated from the strap 18, especially when the slit 22 is near the arms 18a, 18b of the strap, as shown in dashes in FIG. 3. To avoid this problem, use is made of a strap 18 which is preformed for snug contact with practically the entire outer circumference of the outer sleeve 16, as explained earlier.

The embodiment of the web 15 shown in FIG. 5 will now be described. The web 15 is formed by two annular membranes 15a and 15b that come together at the outer sleeve 16 and diverge with distance from the latter, and are continued to form the inner sleeve 14. In another embodiment (not shown) in which the sleeve 14 is a separate part from the web 15, the membranes 15a and 15b are continued to encircle the sleeve 14.

Figure 5:
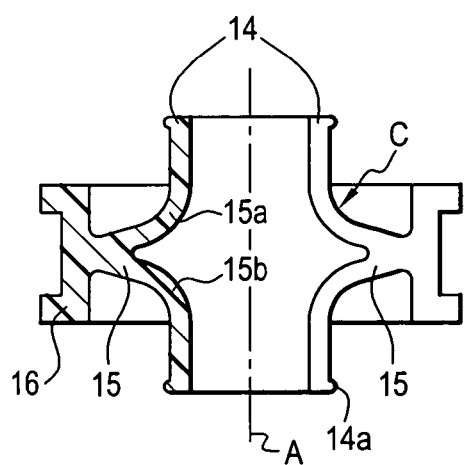
FIG. 5 is a section on the plane V-V through the central part seen in FIG. 4.
Figure 6:
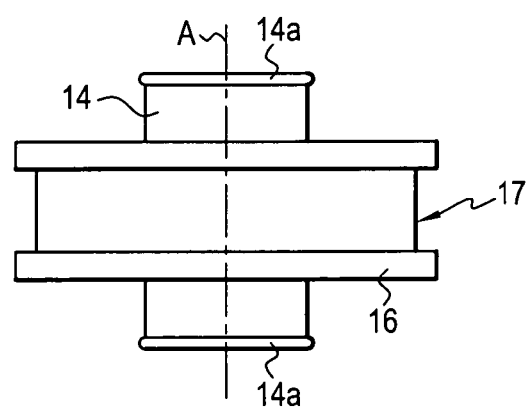
FIG. 6 is a side view in the direction of arrow VI of the central part seen in FIG. 4.

In this way the radial cross section through the web 15, shown on the left-hand side of FIG. 5, is generally Y-shaped, its base joined to the outer sleeve 16 and its arms spreading out and blending into the inner sleeve 14 (or encircling the latter).

Also, advantageously, the arms 15a and 15b diverge with a certain curvature C so that each membrane 15a and 15b is relaxed when the supporting collar is at rest. This particular shape gives the web 15 the desired elasticity of shape.

The invention claimed is:

1. A supporting collar for an element such as a cable or a pipe, comprising a strap capable of being fixed to a support, an outer sleeve encircled by said strap, an inner sleeve through which said element can pass, and a deformable web connecting said inner and outer sleeves and allowing the inner sleeve to move relative to the outer sleeve, said deformable web being formed by two annular membranes that come together at the outer sleeve and diverge with distance from the outer sleeve so that said deformable web, in cross section, is generally Y-shaped, having a base joined to said outer sleeve and two arms spreading out and joined with said inner sleeve at two junctions.

2. A supporting collar according to claim 1, wherein said annular membranes extend to blend with the inner sleeve at said two junctions.

3. A supporting collar according to claim 1, wherein said annular membranes extend to encircle the inner sleeve at said two junctions.

4. A supporting collar for an element, said supporting collar comprising:
   a strap fixable to a support;
   an outer sleeve encircled by said strap;
   an inner sleeve configured to receive said element;
   a deformable web connecting said inner and outer sleeves and allowing the inner sleeve to move relative to the outer sleeve, said deformable web comprising two annular membranes that come together at the outer sleeve and diverge with distance from the outer sleeve; and
   at least one fastening collar capable of being fastened around the inner sleeve.

5. A supporting collar according to claim 1, wherein the web is relaxed when the supporting collar is at rest.

6. A supporting collar according to claim 1, wherein the web is made of an elastic material.

7. A supporting collar according to claim 1, wherein a rib is formed on the outer face of the outer sleeve to house said strap.

8. A supporting collar according to claim 1, wherein the outer sleeve, the web and the inner sleeve form a single central part.

9. A supporting collar according to claim 8, wherein said central part is made of fluorosilicone.

10. A supporting collar according to claim 8, wherein said central part has a slit extending from the inside of the inner sleeve to the outside of the outer sleeve.

11. A supporting collar according to claim 1, wherein said strap is preformed for snug contact with practically the entire outer circumference of the outer sleeve.

12. A supporting collar according to claim 10, wherein said strap is preformed for snug contact with practically the entire outer circumference of the outer sleeve.

13. A supporting collar according to claim 1, wherein said two arms of said deformable web spread out so as to define an annular cavity between said two arms and said element when said element is in said inner sleeve.

14. A supporting collar according to claim 1, wherein said inner and outer sleeves have a common axis of revolution, and wherein said inner sleeve has a length along said axis of revolution that is greater than a length of said outer sleeve along said axis of revolution.

15. A supporting collar according to claim 1, wherein said two annular membranes diverge with a curvature.

16. A supporting collar according to claim 4, wherein said element is a cable.

17. A supporting collar according to claim 4, wherein said element is a pipe.

* * * * *